(12) United States Patent
Kilicli et al.

(10) Patent No.: US 10,380,556 B2
(45) Date of Patent: Aug. 13, 2019

(54) CHANGING MEETING TYPE DEPENDING ON AUDIENCE SIZE

(71) Applicant: Microsoft Technology Licensing, LLC, Redmond, WA (US)

(72) Inventors: Tolga Kilicli, Sammamish, WA (US); Gregory Paul Baribault, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 325 days.

(21) Appl. No.: 14/670,222

(22) Filed: Mar. 26, 2015

(65) Prior Publication Data

US 2016/0283912 A1 Sep. 29, 2016

(51) Int. Cl.
*G06Q 10/10* (2012.01)

(52) U.S. Cl.
CPC ............................. *G06Q 10/1095* (2013.01)

(58) Field of Classification Search
CPC ................................................ G06Q 10/1095
See application file for complete search history.

(56) References Cited

U.S. PATENT DOCUMENTS

| | | | |
|---|---|---|---|
| 7,035,229 B1 * | 4/2006 | Lynch | H04M 3/56 370/260 |
| 7,679,518 B1 | 3/2010 | Pabla et al. | |
| 8,626,550 B2 | 1/2014 | Marston | |
| 8,676,937 B2 | 3/2014 | Rapaport et al. | |
| 2003/0149605 A1 * | 8/2003 | Cragun | G06Q 10/06311 705/7.13 |
| 2003/0208534 A1 * | 11/2003 | Carmichael | G06Q 10/10 709/203 |
| 2006/0067250 A1 * | 3/2006 | Boyer | H04L 12/1818 370/260 |
| 2006/0224427 A1 * | 10/2006 | Salmon | G06Q 10/02 705/7.22 |
| 2007/0050455 A1 * | 3/2007 | Yach | G06Q 10/109 709/206 |
| 2007/0112926 A1 * | 5/2007 | Brett | G06Q 10/109 709/206 |
| 2008/0010347 A1 * | 1/2008 | Houghton | H04L 29/06027 709/205 |
| 2008/0133282 A1 * | 6/2008 | Landar | G06Q 10/02 705/5 |
| 2009/0254839 A1 * | 10/2009 | Kripalani | G06F 3/0231 715/753 |

(Continued)

FOREIGN PATENT DOCUMENTS

| | | |
|---|---|---|
| EP | 2574003 | 3/2013 |
| EP | 1872617 | 12/2013 |

OTHER PUBLICATIONS

"BlueJeans Online Meetings", Retrieved From: <https://www.bluejeans.com/video-collaboration/online-meetings> Feb. 6, 2015, Jul. 4, 2014, 3 pages.

(Continued)

*Primary Examiner* — Sujay Koneru
(74) *Attorney, Agent, or Firm* — Schwegman Lundberg & Woessner, P.A.

(57) ABSTRACT

In one or more embodiments, when an online meeting is being organized, the number of invitees is monitored. Based on the number of invitees, the meeting organizer is automatically prompted to alter the meeting type.

25 Claims, 8 Drawing Sheets

(56) References Cited

U.S. PATENT DOCUMENTS

| | | | | |
|---|---|---|---|---|
| 2010/0124321 A1* | 5/2010 | Alexandrov | .......... | H04L 65/403 379/202.01 |
| 2010/0229103 A1* | 9/2010 | Lin | .................... | H04L 12/1827 715/753 |
| 2011/0268263 A1* | 11/2011 | Jones | .................... | H04M 3/563 379/202.01 |
| 2011/0320044 A1* | 12/2011 | Smith | ................. | G06F 3/04847 700/276 |
| 2013/0027508 A1* | 1/2013 | Charish | ................... | H04M 3/56 348/14.08 |
| 2013/0106985 A1* | 5/2013 | Tandon | .................. | H04N 7/157 348/14.08 |
| 2013/0237240 A1 | 9/2013 | Krantz et al. | | |
| 2013/0262293 A1* | 10/2013 | Garner, Jr. | ............. | G06Q 10/10 705/39 |
| 2013/0263020 A1 | 10/2013 | Heiferman et al. | | |
| 2014/0019858 A1* | 1/2014 | McAllister | ............. | G09G 5/026 715/273 |
| 2014/0047339 A1* | 2/2014 | Epstein | ................. | G06F 3/0484 715/719 |
| 2014/0118403 A1 | 5/2014 | Verthein et al. | | |
| 2014/0149522 A1* | 5/2014 | Mok | ........................ | H04L 51/04 709/206 |
| 2014/0361954 A1* | 12/2014 | Epstein | ................. | G06F 3/1454 345/2.3 |
| 2014/0365921 A1* | 12/2014 | Gupta | ................. | G06F 3/04812 715/758 |
| 2015/0002618 A1* | 1/2015 | Meek | ....................... | H04N 7/15 348/14.09 |
| 2015/0154291 A1* | 6/2015 | Shepherd | .......... | G06F 17/30861 707/748 |
| 2016/0148156 A1* | 5/2016 | Gaucher | ................ | G06Q 10/10 707/736 |

OTHER PUBLICATIONS

"Get More Out of Reservationless Conferencing", Retrieved From: <http://www.intercall.com/services/audio-conferencing/reservationless-plus-features.php> Feb. 16, 2015, Aug. 13, 2014, 3 pages.

"GoTo Meeting Organizer Quick Reference Guide", Available at: <http://support.citrixonline.com/servlet/fileField?retURL=%2Fapex%2FCPDownloadStarter%3FarticleLinkId%3DGTMD00003%26I%3Den_US%26product%3DGOTOMEETING&entityId=ka350000000Te8eAAC&field=Content__Body__s>, 2012, 5 pages.

"RingCentral Office: Online Meetings", Retrieved From: <http://www.ringcentral.com/office/features/online-meetings/overview.html> Feb. 16, 2015, Jan. 22, 2014, 3 pages.

"Service Description: Cisco WebEx Employee Count Subscription Services", Available at: <http://www.cisco.com/web/about/doing_business/legal/service_descriptions/docs/employee_count_subscription_service.pdf>, Jul. 8, 2014, 7 pages.

"Viewing Data about Meetings", Retrieved From: <http://help.adobe.com/en_US/connect/9.0/using/WS605955A1-A049-4da5-AEF0-4FD8C5B19A9A.html>, 3 pages.

Fennell,"Webinars on Fuze", Retrieved From: <https://supportfuze.com/hc/en-us/articles/203435066-Webinars-on-Fuze> Feb. 6, 2015, Dec. 16, 2014, 5 pages.

Jennings,"How to Increase the Maximum Number of Participants in Office Communicator Conference", Retrieved From: <http://serverfault.com/questions/213895/how-to-increase-the-maximum-number-of-participants-in-office-communicator-confer> Feb. 6, 2015, Dec. 17, 2010, 10 pages.

* cited by examiner

CHANGING MEETING TYPE DEPENDING ON AUDIENCE SIZE

BACKGROUND

Online meetings can enable individuals to meet in different ways. For example, one type of online meeting is a broadcast meeting in which the majority of the participants are passive consumers of meeting content and do not, for the most part, actively participate in the meeting. Another type of online meeting is a collaborative meeting in which most or all of the participants share an equal role as a collaborator. These different types of meetings lend themselves to different numbers of participants. For example, broadcast meetings can be more appropriate for larger numbers of participants, e.g., 50, 100 and more. On the other hand, collaborative meetings may be more appropriate for smaller numbers of participants, e.g., 5 to 30.

One problem with different types of online meetings is that meeting organizers may not necessarily know which type of meeting to choose for their particular number of participants. Complicating this even further is that the number of participants may change many times between when an invitation is sent and the meeting is conducted.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more embodiments, when an online meeting is being organized, the number of invitees is monitored. If the number of invitees exceeds a particular threshold, the meeting organizer is prompted to alter the meeting type.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

In one or more embodiments, when an online meeting is being organized, the number of invitees is monitored. If the number of invitees exceeds a particular threshold, the meeting organizer is prompted to alter the meeting type. In this manner, the meeting organizer need not necessarily be aware of the best meeting type to select. Rather, meeting software executing on a computing device can make a recommendation based on the number of invitees. Accordingly, the recommended meeting type can enable for a more efficient meeting delivery method and, as such, can enhance the user's experience.

In the following discussion, an example environment is first described that is operable to employ the techniques described herein. The techniques may be employed in the example environment, as well as in other environments.

Example Environment

Figure 1:
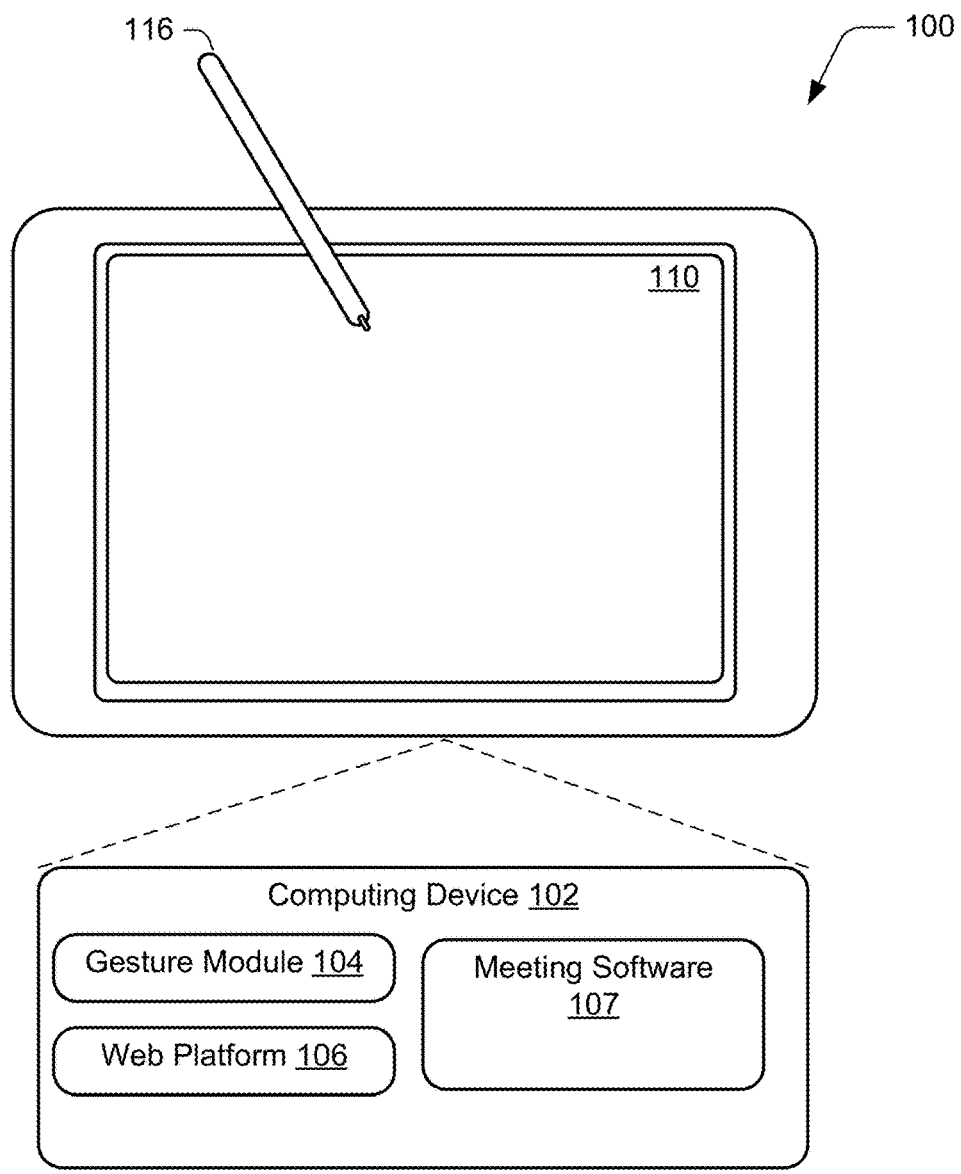
FIG. 1 is an illustration of an example computing device in accordance with one or more embodiments.

FIG. 1 is an illustration of an environment 100 in an example implementation that is operable to employ the techniques as described herein. The illustrated environment 100 includes an example of a computing device 102 that may be configured in a variety of ways. The computing device 102 may be configured as a traditional computer (e.g., a desktop personal computer, laptop computer, and so on), a mobile station, a wireless phone, a netbook, a handheld device, and so forth as further described in relation to FIG. 2. Thus, the computing device 102 may range from full resource devices with substantial memory and processor resources (e.g., personal computers) to a low-resource device with limited memory and/or processing resources. The computing device 102 also includes software that causes the computing device 102 to perform one or more operations as described below.

Computing device 102 can include, by way of example and not limitation, a number of different components including a gesture module 104, a web platform 106, and meeting software 107. The meeting software 107 can include any suitable type of software that enables a meeting to be planned and/or participated in.

The gesture module 104 is operational to provide gesture functionality. The gesture module 104 can be implemented in connection with any suitable type of hardware, software, firmware or combination thereof. In at least some embodiments, the gesture module 104 is implemented in software that resides on some type of computer-readable storage medium examples of which are provided below.

Gesture module 104 is representative of functionality that recognizes gestures that can be performed by one or more fingers, and causes operations to be performed that correspond to the gestures. The gestures may be recognized by module 104 in a variety of different ways. For example, the gesture module 104 may be configured to recognize a touch input, such as a finger of a user's hand as proximal to display device 110 of the meeting room device 102 using touchscreen functionality.

It is to be appreciated and understood that a variety of different types of gestures may be recognized by the gesture module 104 including, by way of example and not limitation, gestures that are recognized from a single type of input (e.g., touch gestures such as the previously described drag-and-drop gesture) as well as gestures involving multiple types of inputs. For example, module 104 can be utilized to recognize single-finger gestures and bezel gestures, multiple-finger/same-hand gestures and bezel gestures, and/or multiple-finger/different-hand gestures and bezel gestures.

For example, the computing device 102 may be configured to detect and differentiate between a touch input (e.g., provided by one or more fingers of the user's hand) and a stylus or pen input (e.g., provided by a stylus 116). The differentiation may be performed in a variety of ways, such as by detecting an amount of the display device 110 that is contacted by the finger of the user's hand versus an amount of the display device 110 that is contacted by the stylus 116.

Thus, the gesture module 104 may support a variety of different gesture techniques through recognition and leverage of a division between stylus and touch inputs, as well as different types of touch inputs.

The web platform 106 is a platform that works in connection with content of the web, e.g. public content. A web platform 106 can include and make use of many different types of technologies such as, by way of example and not limitation, URLs, HTTP, REST, HTML, CSS, JavaScript, DOM, and the like. The web platform 106 can also work with a variety of data formats such as XML, JSON, and the like. Web platform 106 can include various web browsers, web applications (i.e. "web apps"), and the like. When executed, the web platform 106 allows the computing device to retrieve web content such as electronic documents in the form of webpages (or other forms of electronic documents, such as a document file, XML file, PDF file, XLS file, etc.) from a Web server and display them on the display device 110. It should be noted that computing device 102 could be any computing device that is capable of displaying Web pages/documents and connect to the Internet.

Meeting software 107 is representative of software that enables meetings to be planned and/or conducted using various features which can include, by way of example and not limitation, instant messaging, Voice over IP, video conferencing, and the like.

Figure 2:
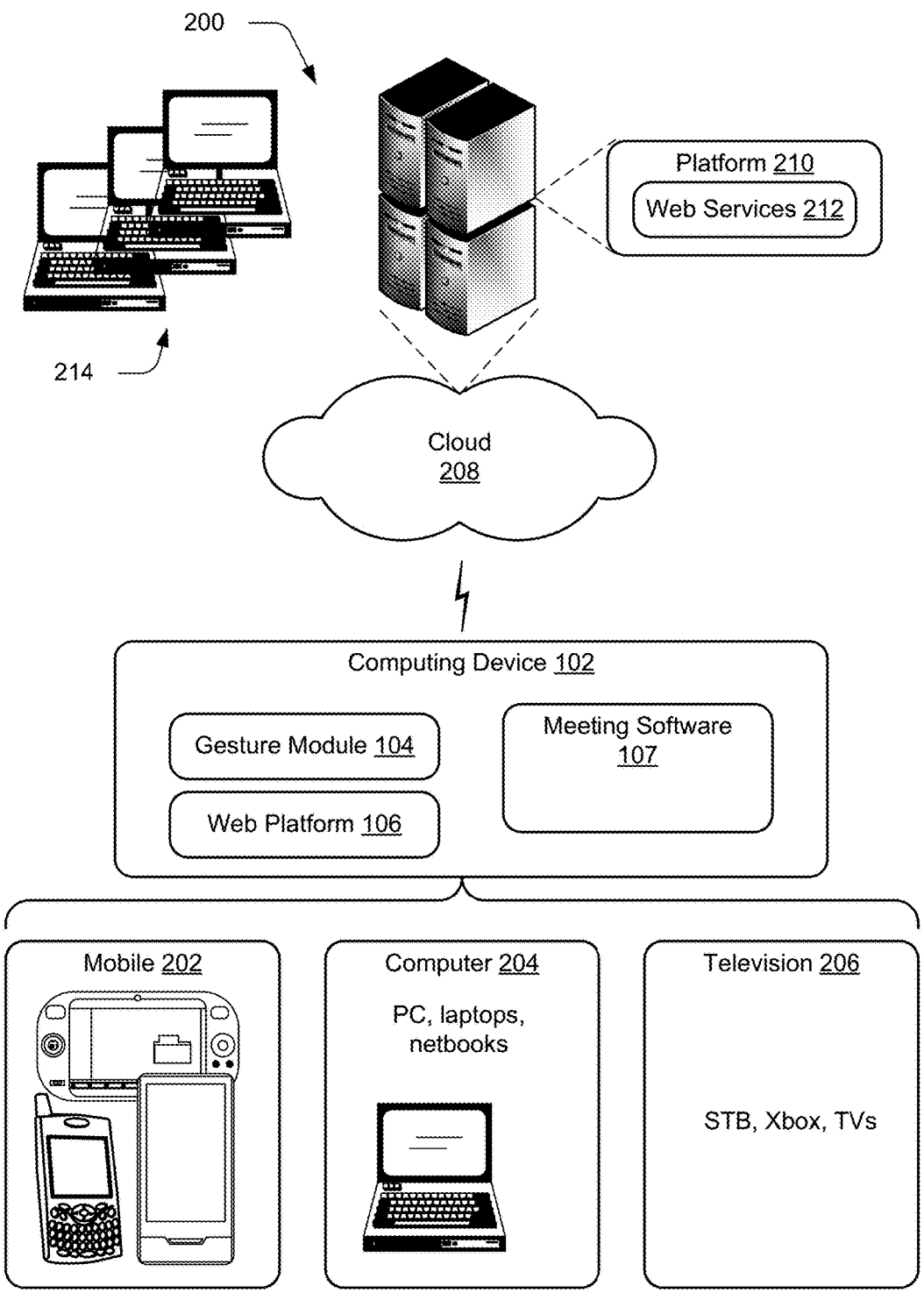
FIG. 2 is an illustration of an example environment in accordance with one or more embodiments.

FIG. 2 illustrates an example system 200 showing the components of FIG. 1, e.g., meeting software 107, as being implemented in an environment where multiple devices are interconnected through a central computing device. The meeting software 107 can enable meetings to be conducted using various features which can include, by way of example and not limitation, instant messaging, Voice over IP, video conferencing, content sharing and the like. The meeting software 107 can also enable various different meeting types to be organized and conducted as described above and below.

The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size and thus the computing device 102 may be configured as one of these device classes in this example system 200. For instance, the computing device 102 may assume the mobile 202 class of device which includes mobile telephones, music players, game devices, and so on. The computing device 102 may also assume a computer 204 class of device that includes personal computers, laptop computers, netbooks, tablets, large form factor devices, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on. One web service that can be provided as part of Web services 212 includes a meeting service. The meeting service can enable online meetings to be conducted. The meeting service can support a variety of different types of meetings including, by way of example and not limitation, broadcast type meetings, collaborative type meetings, and the like.

Thus, the cloud 208 is included as a part of the strategy that pertains to software and hardware resources that are made available to the computing device 102 via the Internet or other networks. For example, aspects of the meeting software 107 may be implemented in part on the computing device 102 as well as in a distributed fashion via platform 210 that supports web services 212.

In addition, system 200 can include one or more remote computing devices 214 associated with remote participants who can participate in a meeting organized and conducted through computing device 102. Each of the remote computing devices 214 can execute a meeting client that enables communication with meeting software 107.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

For example, the computing device may also include an entity (e.g., software) that causes hardware or virtual machines of the computing device to perform operations, e.g., processors, functional blocks, and so on. For example, the computing device may include a computer-readable medium that may be configured to maintain instructions that cause the computing device, and more particularly the operating system and associated hardware of the computing device to perform operations. Thus, the instructions function to configure the operating system and associated hardware to perform the operations and in this way result in transformation of the operating system and associated hardware to perform functions. The instructions may be provided by the computer-readable medium to the computing device through a variety of different configurations.

One such configuration of a computer-readable medium is a signal bearing medium and thus is configured to transmit the instructions (e.g., as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

In the discussion that follows, a section entitled "Changing Meeting Type Depending on Audience Size" describes how meeting types can be changed depending on audience size. Following this, a section entitled "Adaptive Aspects of Changing Meeting Types" describes how meeting types can be adaptively changed in accordance with one or more embodiments. Last, a section entitled "Example Device" describes aspects of an example device that can be utilized to implement one or more embodiments.

Having considered an example operating environment, consider now a discussion of how meeting entrants can be directed based on their role in the meeting.

Changing Meeting Type Depending on Audience Size

Figure 3:
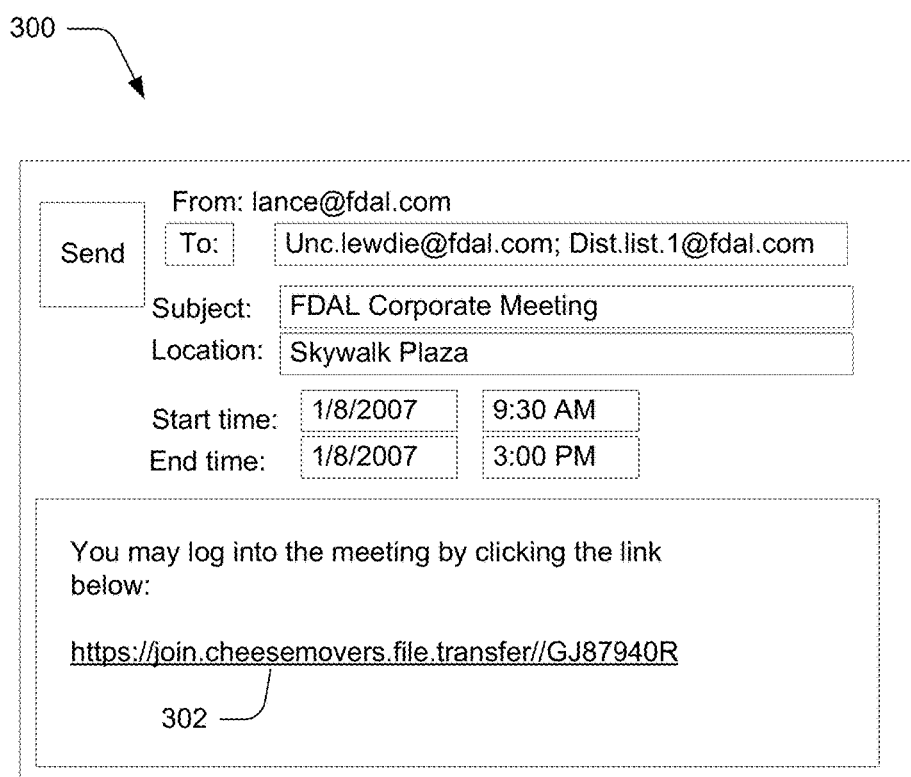
FIG. 3 is an illustration of an example meeting invitation in accordance with one or more embodiments.

In one or more embodiments, when an online meeting is being organized, the number of invitees is monitored. If the number of invitees exceeds a particular threshold, the meeting organizer is prompted to alter the meeting type. As an example, consider FIG. 3.

There, a meeting invitation is shown generally at 300. The invitation type is addressed to two different recipients—an individual ("Unc.lewdie@fdal.com") and a distribution list of attendees ("Dist.list.1@fdal.com"). A join link is provided in the invitation and is shown generally at 302. The join link and can be clicked on or otherwise selected by a recipient in order to join the meeting that is being planned.

Figure 4:
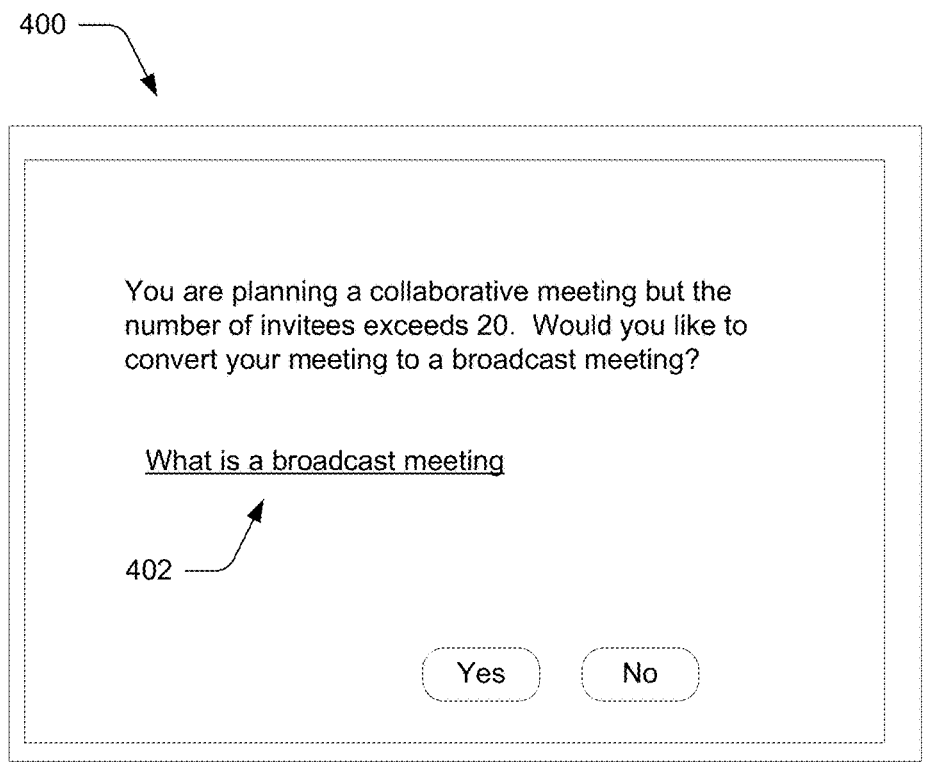
FIG. 4 is an illustration of an example prompt in accordance with one or more embodiments.

As the meeting organizer assembles the meeting invite, the meeting software, such as a suitably-configured calendar-scheduling system, examines the contents of the "To:" line, the "cc:" line and any other line that includes invitees. The meeting software counts the number of invitees which can include opening any distribution lists that are included in the meeting invite. The meeting software also removes, for purposes of counting the number of invitees, any duplicates that are observed amongst the invitees. So, for example, if Unc.lewdie@fdal.com appears in the list of distribution list, she would be removed from the distribution list. Once the number of being invitees has been ascertained, the meeting software determines whether the number exceeds a definable threshold. The threshold can be a default threshold or a configurable threshold that can be set by an individual such as an IP administrator. If the number exceeds a particular threshold, a recommendation can be provided to the organizer to convert the meeting into a different type of meeting. As an example, consider FIG. 4.

Figure 5:
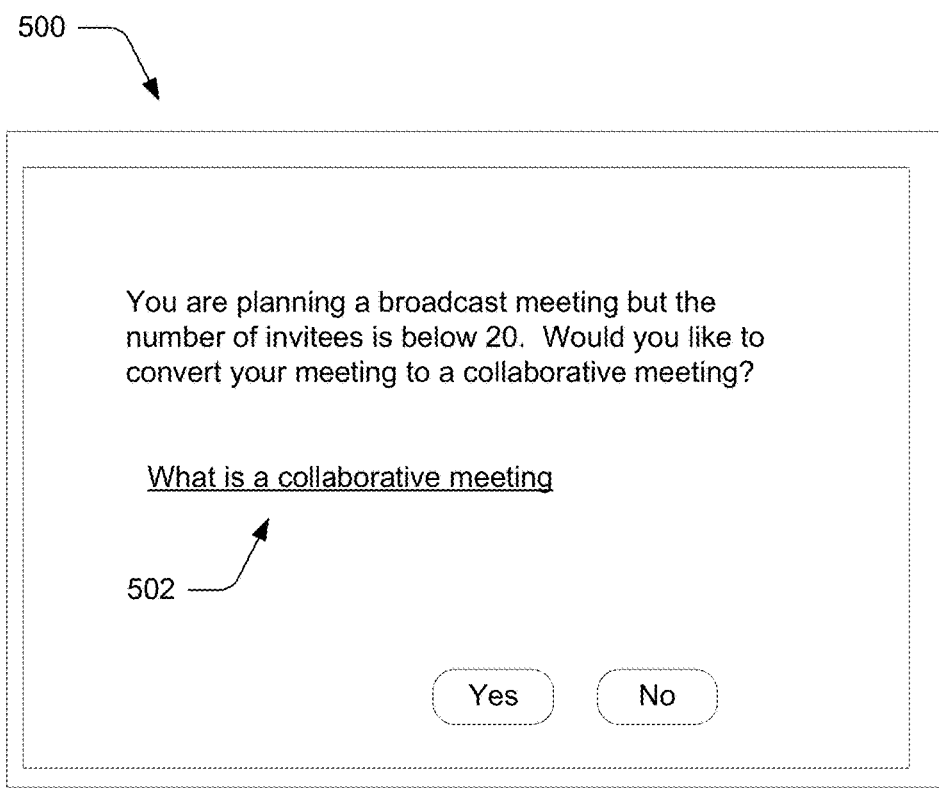
FIG. 5 is an illustration of an example prompt in accordance with one or more embodiments.

There, a prompt is shown generally at 400. The prompt informs the meeting organizer that the meeting they are planning exceeds a threshold number. The prompt then provides an option for the meeting organizer to convert their meeting to a different type of meeting. In this particular example the meeting organizer is planning a collaborative meeting. Recall that collaborative meetings tend to work better with smaller numbers of attendees. However, because the number of invitees exceeds a threshold of 20, the meeting software provides an option to convert the meeting to a broadcast meeting. Recall that broadcast meetings tend to work better with larger numbers of attendees. In addition, a link 402 is provided and can be selected by a meeting organizer to learn more about the meeting type that is being suggested. In addition, "yes" and "no" buttons are provided to enable the user to either convert to the suggested meeting type or continue on their current course. As another example, consider FIG. 5.

There, a prompt is shown generally at 500. The prompt informs the meeting organizer that the meeting they are planning is below a threshold number. The prompt then provides an option for the meeting organizer to convert their meeting to a different type of meeting. In this particular example the meeting organizer is planning a broadcast meeting. However, because the number of invitees is below a threshold of 20, the meeting software provides an option to convert the meeting to a collaborative meeting. In addition, a link 502 is provided and can be selected by a meeting organizer to learn more about the meeting type that is being suggested. In addition, "yes" and "no" buttons are provided to enable the user to either convert to the suggested meeting type or continue on their current course.

Having considered the various embodiments above, consider now adaptive aspects of changing meeting types based upon audience size.

Adaptive Aspects of Changing Meeting Types

In one or more embodiments, after a meeting has been planned as by having the meeting invitations sent out, the number of invitees may change. For example, the meeting invitation may be forwarded to other people who were not originally included in the initial meeting invitation. Alternately or additionally, one or more of the distribution lists may have grown or shrunk depending on whether members have been added or removed. Based on the number of invitees changing after the meeting has been planned, the meeting organizer can be prompted to change the particular meeting type.

Figure 6:
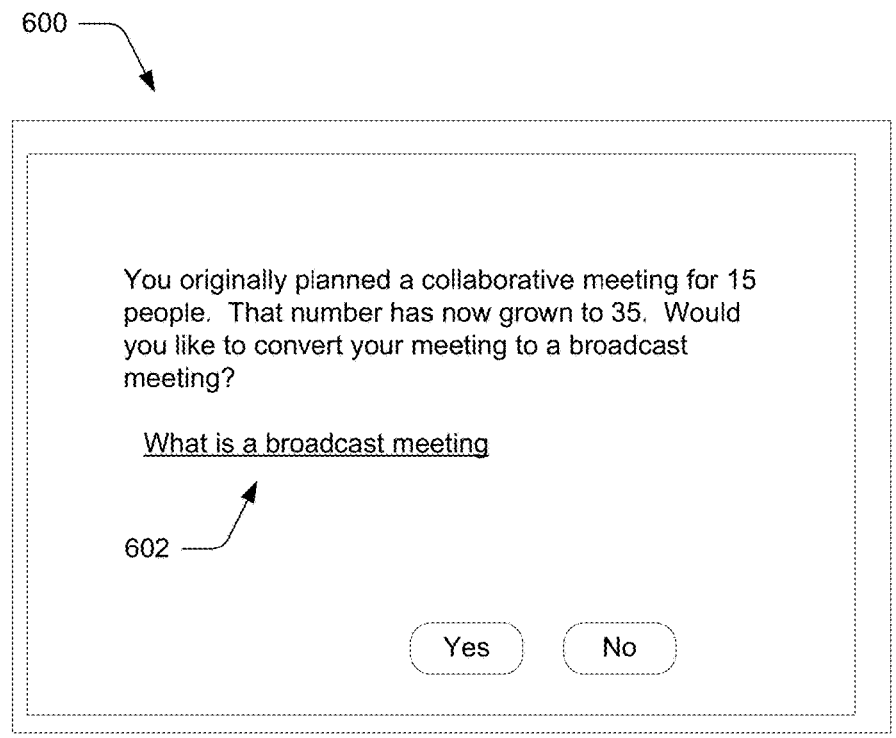
FIG. 6 is an illustration of an example prompt in accordance with one or more embodiments.

For example, if the meeting is initially organized as a collaborative meeting for 15 invitees, but 20 additional invitees are subsequently added, the prompt can be provided to enable the meeting organizer to change meeting types. As an example, consider FIG. 6.

There, a prompt is shown generally at 600. The prompt informs the meeting organizer that the meeting was originally planned for 15 people but now, that number has grown to 35. The prompt then provides an option for the meeting organizer to convert their meeting to a different type of meeting. In this particular example the meeting organizer originally planned a broadcast meeting. However, because the number of invitees subsequently grew to 35, the meeting software provides an option to convert the meeting to a collaborative meeting. In addition, a link 602 is provided and can be selected by a meeting organizer to learn more about the meeting type that is being suggested. In addition, "yes" and "no" buttons are provided to enable the user to either convert to the suggested meeting type or continue on their current course.

By providing adaptive notification, as described above, the meeting organizer can be informed, after the meeting has been planned, that a more efficient meeting type may be appropriate based on the number of invitees.

In addition, during the course of the meeting more and more people may join thus making a different meeting type a more efficient selection. In this instance, the meeting organizer can be notified by prompt, similar to that shown in FIG. 6, to enable them to convert the meeting from one meeting type to another.

Having considered the various embodiments described above, consider now an example methods in accordance with one or more embodiments.

Figure 7:
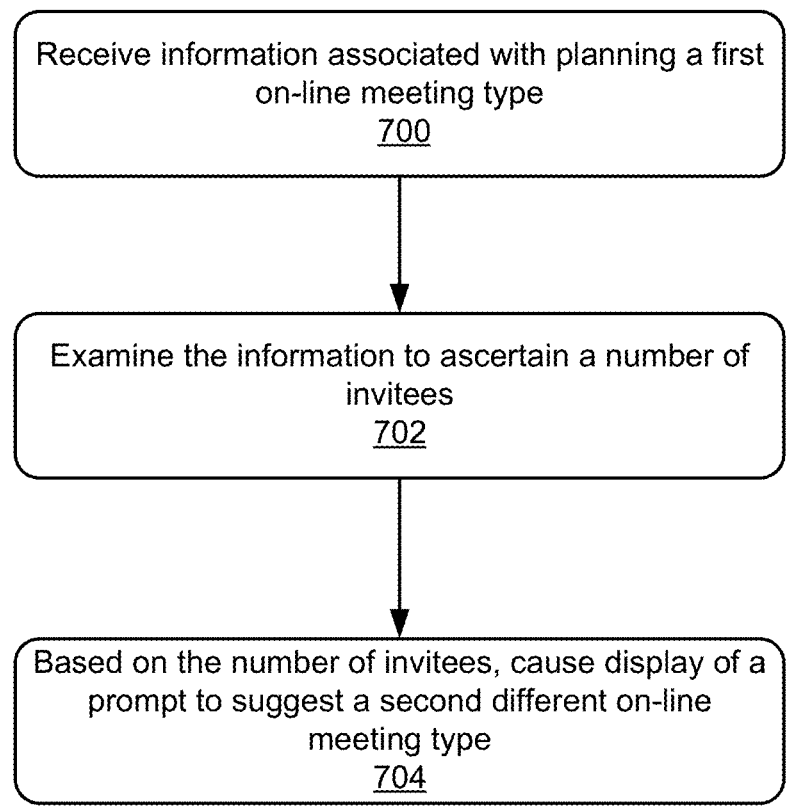
FIG. 7 is a flow diagram that describes steps in a method in accordance with one or more embodiments.

FIG. 7 is a flow diagram that describes steps in a method in accordance with one or more embodiments. The method can be implemented in connection with any suitable hardware, software, firmware, or combination thereof. In at least some embodiments, the method is implemented by suitably-configured a meeting software application, such as a calendar application, that is configured to enable meetings to be organized.

Step 700 receives information associated with planning a first on-line meeting type. Any suitable meeting type can be utilized examples of which include collaborative meetings, broadcast meetings, as well as others. Step 702 examines the information to ascertain a number of invitees. This step can be performed in any suitable way, examples of which are provided above. Based on the number of invitees, step 704 causes display of a prompt to suggest a second different on-line meeting type. Any suitable meeting type can be utilized, examples of which are provided above.

Having considered the various embodiments described above, consider now an example computing device that can be utilized to implement one or more of the embodiments described above.

Example Computing Device

Figure 8:
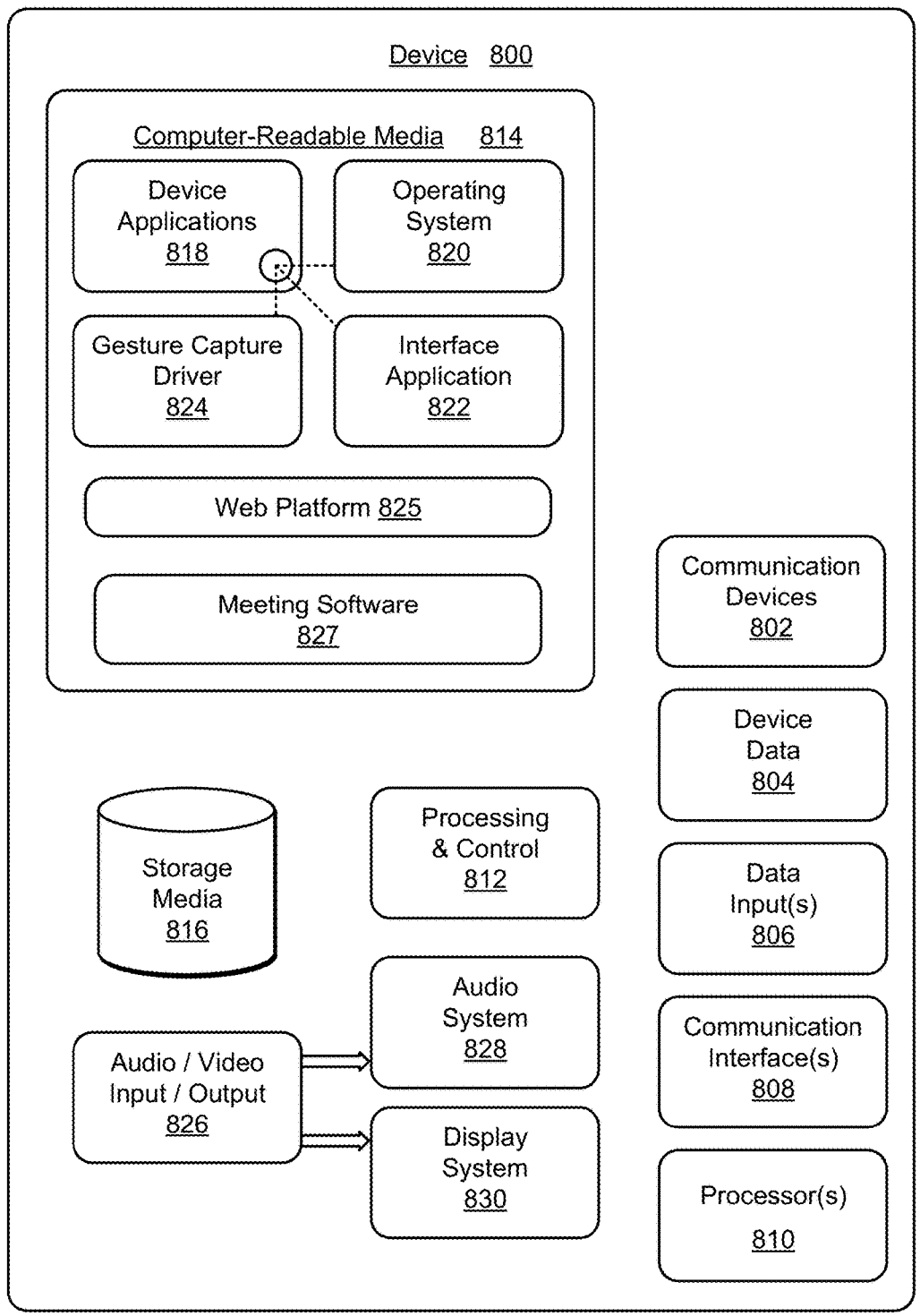
FIG. 8 illustrates an example computing device that can be utilized to implement various embodiments described herein.

FIG. 8 illustrates various components of an example computing device 800 that can be implemented as any type of computing device as described with reference to FIGS. 1 and 2 to implement embodiments of the techniques described herein. Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800, such as in the context of the meeting.

Device 800 includes one or more processors 810 (e.g., any of microprocessors, controllers, and the like) which process various computer-executable instructions to control the operation of device 800 and to implement embodiments of the techniques described herein. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable media 814 provides data storage mechanisms to store the device data 804, as well as various device applications 818 and any other types of information and/or data related to operational aspects of device 800. For example, an operating system 820 can be maintained as a computer application with the computer-readable media 814 and executed on processors 810. The device applications 818 can include a device manager (e.g., a control application, software application, signal processing and control module, code that is native to a particular device, a hardware abstraction layer for a particular device, etc.). The device applications 818 also include any system components or modules to implement embodiments of the techniques described herein. In this example, the device applications 818 include an interface application 822 and a gesture capture driver 824 that are shown as software modules and/or computer applications. The gesture capture driver 824 is representative of software that is used to provide an interface with a device configured to capture a gesture, such as a touchscreen, track pad, camera, and so on. Alternatively or in addition, the interface application 822 and the gesture capture driver 824 can be implemented as hardware, software, firmware, or any combination thereof. Additionally, computer readable media 814 can include a web platform 825 and meeting software 827 that functions as described above.

Device 800 also includes an audio and/or video input-output system 826 that provides audio data to an audio system 828 and/or provides video data to a display system 830. The audio system 828 and/or the display system 830 can include any devices that process, display, and/or otherwise render audio, video, and image data. Video signals and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

Example Implementations

Example implementations employing a meeting summary described herein include, but are not limited to, one or any combination of one or more of the following example:

A computer-implemented method comprising: receiving, by a computing device, information associated with planning a first on-line meeting type; examining, by the computing device, said information to ascertain a number of invitees; based on the number of invitees, causing display of a prompt, on a display device of the computing device, to suggest a second different on-line meeting type.

A method as described above, wherein said examining comprises examining a "To:" line of an associated meeting invite.

A method as described above, wherein said examining comprises examining a "cc:" line of an associated meeting invite.

A method as described above, wherein said examining comprises opening any distribution lists that are referenced in an associated meeting invite and counting the number of invitees.

A method as described above, wherein said examining comprises removing any duplicate invitees.

A method as described above, wherein one of the first or second on-line meeting types comprises a collaborative meeting.

A method as described above, wherein one of the first or second on-line meeting types comprises a broadcast meeting.

A method as described above further comprising after a meeting that was the subject of the first on-line meeting type has been planned, and responsive to a change in the number of invitees, causing display of a different prompt, to suggest a different on-line meeting type.

A computer-implemented method comprising: receiving, by a computing device, information associated with planning a first on-line meeting type; examining, by the computing device, said information to ascertain a number of invitees; based on the number of invitees, causing display of a prompt, on a display device of the computing device, to suggest a second different on-line meeting type; and wherein one of the first or second on-line meeting types comprises a collaborative meeting, and the other of the first or second on-line meeting types comprises a broadcast meeting.

A method as described above, wherein said examining comprises examining a "To:" line of an associated meeting invite.

A method as described above, wherein said examining comprises examining a "cc:" line of an associated meeting invite.

A method as described above, wherein said examining comprises opening any distribution lists that are referenced in an associated meeting invite and counting the number of invitees.

A method as described above, wherein said examining comprises removing any duplicate invitees.

A method as described above, further comprising after a meeting that was the subject of the first on-line meeting type has been planned, and responsive to a change in the number of invitees, causing display of a different prompt, to suggest a different on-line meeting type.

A system comprising: one or more processors; one or more computer readable media; computer readable instructions stored on the one or more computer readable media which, when executed by the one or more processors, perform operations comprising: receiving information associated with planning a first on-line meeting type; examining said information to ascertain a number of invitees; based on the number of invitees, causing display of a prompt, on a display device of the computing device, to suggest a second different on-line meeting type; wherein one of the first or second on-line meeting types comprises a collaborative meeting, and the other of the first or second on-line meeting types comprises a broadcast meeting.

A system as described above, wherein said examining comprises examining a "To:" line of an associated meeting invite.

A system as described above, wherein said examining comprises examining a "cc:" line of an associated meeting invite.

A system as described above, wherein said examining comprises opening any distribution lists that are referenced in an associated meeting invite and counting the number of invitees.

A system as described above, wherein said examining comprises removing any duplicate invitees.

A system as described above further comprising after a meeting that was the subject of the first on-line meeting type has been planned, and responsive to a change in the number of invitees, causing display of a different prompt, to suggest a different on-line meeting type.

Conclusion

In one or more embodiments, when an online meeting is being organized, the number of invitees is monitored. Based on the number of invitees, the meeting organizer is automatically prompted to alter the meeting type.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method comprising:
receiving, by a computing device, information for an on-line meeting associated with a first on-line meeting type corresponding to a collaborative meeting designating a, number of invitees as collaborators;
examining, by the computing device, said information to ascertain a number of invitees of the meeting;
based on the number of invitees exceeding a threshold, causing display on a display device of a prompt configured to include a selectable option to convert the collaborative meeting to a broadcast meeting, wherein the broadcast meeting comprises a predetermined number of invitees as passive consumers of meeting content; and
if a selection of the option to convert the collaborative meeting to the suggested broadcast meeting is received, causing a conversion of the collaborative meeting to the suggested broadcast meeting.

2. The method of claim 1, wherein said examining comprises examining a "To:" line of an associated meeting invite.

3. The method of claim 1, wherein said examining comprises examining a "cc:" line of an associated meeting invite.

4. The method of claim 1, wherein said examining comprises opening any distribution lists that are referenced in an associated meeting invite and counting the number of invitees.

5. The method of claim 1, wherein said examining comprises removing any, duplicate invitees.

6. The method of claim 1 further comprising responsive to receiving an indication of a change in the number of invitees, causing display of a different prompt configured to suggest a different on-line meeting type.

7. The method of claim 1, wherein the number of invitees exceeds a threshold for the first on-line meeting type.

8. The method of claim 1, wherein a collaborative meeting comprises assigning each invitee of the on-line meeting as a collaborator.

9. The method of claim 1, wherein a broadcast meeting comprises assigning each invitee of the on-line meeting as a passive consumer of meeting content.

10. A computer-implemented method comprising:
receiving, by a computing device, information for planning a meeting associated with a first on-line meeting type corresponding to a collaborative meeting designating a number of invitees as collaborators;
examining, by the computing device, said information to ascertain a number of invitees of the meeting;
based on the number of invitees exceeding a threshold, causing display on a display device of a prompt configured to include a selectable option to convert the collaborative meeting to a broadcast meeting, wherein the broadcast meeting comprises a predetermined number of invitees as passive consumers of meeting content; and
responsive to receiving a selection of the option to convert the collaborative meeting to the suggested broadcast meeting, causing a conversion of the collaborative meeting to the suggested broadcast meeting.

11. The computer-implemented method of claim 10, wherein said examining comprises examining a "To:" line and a "cc:" line of an associated meeting invite.

12. The computer-implemented method of claim 10, wherein said examining comprises opening any distribution lists that are referenced in an associated meeting invite and counting the number of invitees.

13. The computer-implemented method of claim 10, wherein said examining comprises removing any duplicate invitees.

14. The computer-implemented method of claim 10, further comprising after the meeting has been planned, and responsive to receiving an indication of a change in the number of invitees, causing display of a different prompt configured to suggest a different on-line meeting type.

15. The method of claim 10, wherein the number invitees exceeds a threshold for the first on-line meeting type.

16. The method of claim 10, wherein a collaborative meeting comprises assigning each invitee of the on-line meeting as a collaborator.

17. The method of claim 10, wherein a broadcast meeting comprises assigning each invitee of the on-line meeting as a passive consumer of meeting content.

18. A system comprising:
one or more processors;
one or more computer readable media;
computer readable instructions stored on the one or more computer readable media which, when executed by the one or more processors, perform operations comprising:
receiving information for an on-line meeting associated with a first on-line meeting type corresponding to a collaborative meeting designating a predetermined number of invitees as collaborators;
examining said information to ascertain a number of invitees of the meeting;
based on the number of invitees exceeding a threshold, causing display on a display device of a prompt configured to include a selectable option to convert the collaborative meeting to a broadcast meeting, wherein the broadcast meeting comprises a predetermined number of invitees as passive consumers of meeting content; and
if a selection of the option to convert the collaborative meeting to the suggested broadcast meeting is received, causing a conversion of the collaborative meeting to the suggested broadcast meeting.

19. The system of claim 18, wherein said examining comprises examining a "To:" line of an associated meeting invite.

20. The system of claim 18, wherein said examining comprises examining a "cc:" line of an associated meeting invite.

21. The system of claim 18, wherein said examining comprises opening any distribution lists that are referenced in an associated meeting invite and counting the number of invitees.

22. The system of claim 18, wherein said examining comprises removing any duplicate invitees.

23. The system of claim 18, wherein the number of invitees exceeds a threshold for the first on-line meeting type.

24. The system of claim 18, wherein a collaborative meeting comprises assigning each invitee of the on-line meeting as a collaborator.

25. The system of claim 18, wherein a broadcast meeting comprises assigning each invitee of the on-line meeting as a passive consumer of meeting content.

* * * * *